US008827036B2

(12) United States Patent
Lee

(10) Patent No.: US 8,827,036 B2
(45) Date of Patent: Sep. 9, 2014

(54) COMPOSITE SOUND ABSORBING MATERIAL FOR VEHICLE AND METHOD OF MANUFACTURING THE SAME

(71) Applicant: Hyundai Motor Company, Seoul (KR)

(72) Inventor: Dong Uk Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/717,193

(22) Filed: Dec. 17, 2012

(65) Prior Publication Data

US 2014/0144722 A1 May 29, 2014

(30) Foreign Application Priority Data

Nov. 26, 2012 (KR) ........................ 10-2012-0134469

(51) Int. Cl.
*E04B 1/84* (2006.01)

(52) U.S. Cl.
USPC .......................................... 181/290; 181/293

(58) Field of Classification Search
USPC ................................. 181/290, 291, 293, 294
See application file for complete search history.

(56) References Cited

U.S. PATENT DOCUMENTS

| | | | | |
|---|---|---|---|---|
| 6,528,437 | B1 * | 3/2003 | Hepfinger et al. | 442/38 |
| 7,654,364 | B2 * | 2/2010 | Yamaguchi et al. | 181/293 |
| 2002/0053484 | A1 * | 5/2002 | Murakami et al. | 181/293 |
| 2008/0001431 | A1 * | 1/2008 | Thompson et al. | 296/187.01 |
| 2008/0099278 | A1 * | 5/2008 | Simon et al. | 181/293 |
| 2008/0230309 | A1 * | 9/2008 | Fox et al. | 181/286 |

FOREIGN PATENT DOCUMENTS

| | | |
|---|---|---|
| KR | 10-2002-0035818 | 5/2002 |
| KR | 10-2009-0089132 | 8/2009 |
| KR | 10-2010-0123014 | 11/2010 |

* cited by examiner

*Primary Examiner* — Jeremy Luks
(74) *Attorney, Agent, or Firm* — Edwards Wildman Palmer LLP; Peter F. Corless

(57) ABSTRACT

Disclosed is a composite sound absorbing material for a vehicle, which improves a sound absorption coefficient of a low-to-mid frequency region and provides a weight reduction effect, and a method of manufacturing the composite sound absorbing material. The method includes a first step of laminating fabric in a sheet form with a film by using a bonding tool and a second step of puncturing the fabric laminated with the film to thereby manufacture punctured nonwoven fabric.

6 Claims, 7 Drawing Sheets

SOUND ABSORBING MATERIAL(13)
PUNCTURED NONWOVEN FABRIC(11)
SOUND ABSORBING MATERIAL(12)
10

| HOLE SIZE (mm) | APETURE RATIO | HOLE INTERVAL (mm) |
|---|---|---|
| 0.01 | 0.1 | 0.28 |
| | 1.0 | 0.09 |
| | 2.0 | 0.06 |
| | 3.0 | 0.05 |
| 0.1 | 0.1 | 2.80 |
| | 1.0 | 0.89 |
| | 2.0 | 0.63 |
| | 3.0 | 0.51 |
| 1.0 | 0.1 | 28.02 |
| | 1.0 | 8.86 |
| | 2.0 | 6.27 |
| | 3.0 | 5.12 |
| 2.0 | 0.1 | 56.05 |
| | 1.0 | 17.72 |
| | 2.0 | 12.53 |
| | 3.0 | 10.23 |
| 3.0 | 0.1 | 84.07 |
| | 1.0 | 26.59 |
| | 2.0 | 18.90 |
| | 3.0 | 15.35 |

[PUNCHING PATTERN]

COMPOSITE SOUND ABSORBING MATERIAL FOR VEHICLE AND METHOD OF MANUFACTURING THE SAME

CROSS-REFERENCE TO RELATED APPLICATION

This application claims under 35 U.S.C. §119(a) the benefit of Korean Patent Application No. 10-2012-0134469 filed on Nov. 26, 2012, the entire contents of which are incorporated herein by reference.

BACKGROUND (a) Technical Field

The present invention generally relates to a composite sound absorbing material for a vehicle and a method for manufacturing the same, and more particularly, to a composite sound absorbing material and method of manufacture which improves a sound absorption coefficient of a low-to-mid frequency region and which is lightweight.

(b) Background Art

Recently, in order to improve customer satisfaction, car manufacturers have been addressing the issue of vehicle noise reduction. Accordingly, the reduced level of noise in a vehicle has been used in marketing a vehicle brand.

Improvement of sound absorption/transmission performance is closely related to quality, weight, and thickness of a sound absorbing/transmitting material. Conventionally, in order to reduce vehicle noise, the weight and thickness of the sound absorbing/transmitting material has been increased. However, but such a solution is limited due to fuel efficiency and limited space within the vehicle.

Hence, a porous sound absorbing material, such as glass wool, resin felt, polyethylene terephthalate (PET) felt, or the like, has been used. These materials are useful in terms of sound absorbing performance in a high-frequency region by increasing their thickness and weight. However, such materials cannot provide improvement for noise in a low-to-mid frequency region of 2 kHz or less.

Thus, composite sound absorbing/transmitting materials manufactured by stacking and combining various types of sound absorbing materials and sound transmitting materials have been used together with porous sound absorbing materials.

A conventional composite sound absorbing/transmitting material is in the form of a composite layer in which a sound absorbing material having a porous structure and a sound transmitting material having a non-ventilation structure are stacked. For example, as shown in FIGS. 5A through 5C, the composite sound absorbing/transmitting material may have a form in which skin nonwoven fabric, polyurethane (PU) foam, and skin nonwoven fabric are stacked; a form in which skin nonwoven fabric, resin felt, and rubber are stacked; or a form in which PU foam, rubber, and PET felt are stacked.

Such conventional composite sound absorbing/transmitting materials may be applied to, for example, a hood insulator, a dash insulator, and a dash iso pad of a vehicle.

However, these conventional composite sound absorbing/transmitting materials which utilize a rubber type of sound transmitting material have increased weight (see, e.g., FIGS. 5B, 5C), and when they do not include the rubber type of sound transmitting material (see, e.g., FIG. 5A), they have increased thickness which results in weight increase.

SUMMARY OF THE DISCLOSURE

Accordingly, the present invention provides a composite sound absorbing material for a vehicle which improves a sound absorption coefficient of a low-to-mid frequency region and, at the same time, is lightweight. The present invention further provides a method of manufacturing the composite sound absorbing material.

According to an aspect of the present invention, a method of manufacturing a composite sound absorbing material for a vehicle is provided. The method includes a first step of laminating fabric in a sheet form and a film, for example by using a bonding tool, and a second step of manufacturing punctured nonwoven fabric by puncturing the fabric laminated with the film.

According to various embodiments, the method further includes attaching a sound absorbing material to one surface or both surfaces of the punctured nonwoven fabric. The attaching of the sound absorbing material may include attaching the sound absorbing material to the punctured nonwoven fabric by using thermoplastic resin in a powder form, or attaching the sound absorbing material to the punctured nonwoven fabric by using a film in a web form or a film having an adhesive property as the film of the punctured nonwoven fabric.

The second step may include adjusting a sound absorption coefficient by changing and adjusting one or more of an aperture size and an aperture ratio of the punctured nonwoven fabric. According to an exemplary embodiment, the punctured nonwoven fabric is manufactured in a form in which an aperture having a diameter of about 0.01-about 3.0 mm is punched, and an aperture ratio of the punctured nonwoven fabric is about 0.1-about 3.0.

According to another aspect of the present invention, a composite sound absorbing material for a vehicle is provided. In particular, the composite sound absorbing material includes a punctured nonwoven fabric comprising fabric in a sheet form and a film bonded to both surfaces of the fabric to form a non-ventilation structure in the fabric, in which a plurality of apertures are provided in the punctured nonwoven fabric.

According to various embodiments, the sound absorbing material is adhered to one surface or both surfaces of the punctured nonwoven fabric.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

Figure 1A:
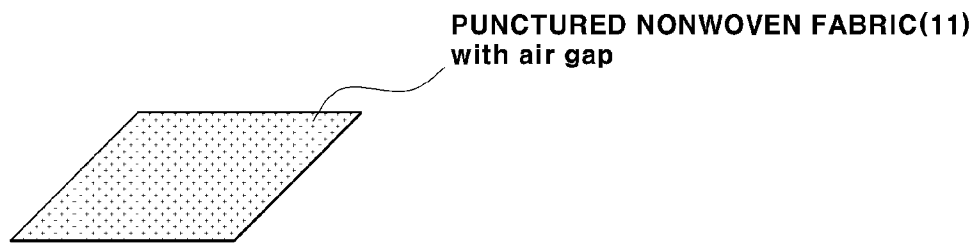
FIGS. 1A through 1C are diagrams showing three different types of a composite sound absorbing material for a vehicle according to embodiments of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings to allow those of ordinary skill in the art to easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The present invention relates to a method of manufacturing a composite sound absorbing material, particularly a material including punctured nonwoven fabric, which can improve a sound absorption coefficient of a low-to-mid frequency region. According to various aspects, post-processing is performed on fabric which is favorable to thermoforming to provide sound absorbing properties, and the manufactured composite sound absorbing material has superior formability, thus allowing systemization of parts based on thermoforming.

Figure 2:
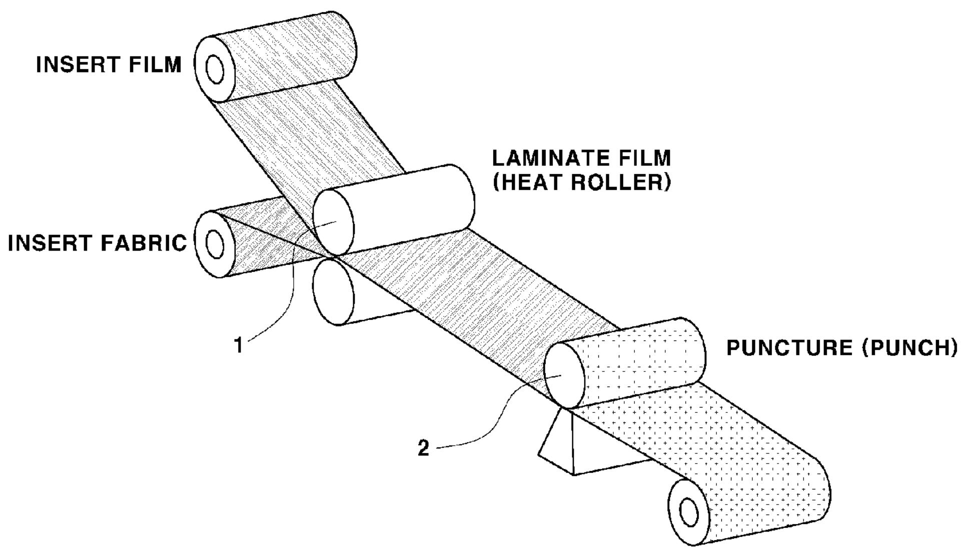
FIG. 2 is a diagram schematically showing a process of manufacturing a composite sound absorbing material for a vehicle according to an embodiment of the present invention.

As shown in FIG. 2, a composite sound absorbing material according to the present invention may be manufactured by roughly two steps: a laminating step and a punching step.

First, in the laminating step, fabrics and films are provided and are laminated using a bonding tool 1, such as a heat roller.

As referred to herein, the fabric collectively refers to any fabric which can be used in the form of a sheet. Further, the film is a multi-layer film that gives a non-ventilation structure on a bonding surface (a region to which the film is adhered) of the fabric and, at the same time, serves as an adhesive for a rear-surface sound absorbing material as will be described later.

The heat roller for lamination, when operating, is maintained at a temperature range in which lamination can be achieved, for example within about 50-200° C. Further, in order to guarantee sufficient hardening prior to arrival at a punching tool after lamination, a proper distance should be provided between the heat roller and the punching tool, for example about 1 m or more.

In the laminating step, the fabric and the film may be laminated using various other bonding tools as well in addition to the heat roller.

Next, in the punching step, the fabric laminated with the film is punctured using the punching tool 2. In particular, the punching tool 2 is configured and arranged such that multiple apertures (or a porous structure) are formed in the fabric.

As such, by puncturing the fabric which has been laminated with the film in the laminating step, a punctured nonwoven fabric having air gaps in accordance with the multiple apertures is manufactured.

Figure 3:
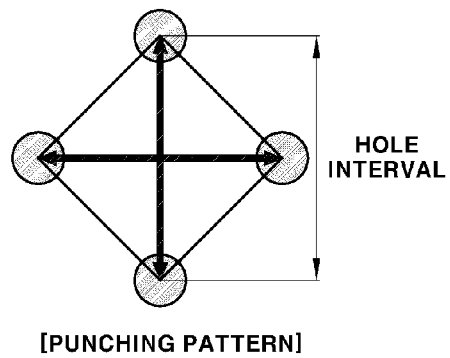
FIG. 3 is a diagram showing a table of an aperture size, an aperture interval, and an aperture ratio of punctured nonwoven fabric and a punching pattern of the punctured nonwoven fabric according to an embodiment of the present invention.

The punctured nonwoven fabric may be formed to have a desired aperture size, an aperture interval, and an aperture ratio, such as those indicated in a table shown in FIG. 3. Further, according to an exemplary embodiment, a punching pattern of the punctured nonwoven fabric can be formed based on an interval between apertures such that four adjacent apertures form a square structure, and an aperture ratio may be calculated by dividing an area (or a size) of an aperture by an area of a square formed by four adjacent apertures as expressed below:

$$\text{Aperture Ratio} = \frac{\text{Hole size}(r^2\pi)}{\text{Area of square}(w^2)},$$

wherein r indicates a diameter of an aperture and w indicates an interval between adjacent apertures.

According to preferred embodiments, the punctured nonwoven fabric is manufactured in a form in which apertures having a diameter of about 0.01-30 mm are punched, and the aperture ratio of the punctured nonwoven fabric may be about 0.1-3.0. For example, the punctured nonwoven fabric may be manufactured to have a combination of an aperture size and an aperture ratio as indicated in the table shown in FIG. 3.

However, the present invention is not limited to the aperture size, apertures interval, and aperture ratio of the punctured nonwoven fabric shown in FIG. 3. Rather, the punctured nonwoven fabric may be manufactured with various other aperture sizes, intervals and ratios as long as the fabric can be manufactured and used in the form of a sheet (fabric including woven and knitted types).

The film forming the punctured nonwoven fabric may implement a non-ventilation structure on the surface of the punctured nonwoven fabric (except for apertures formed in the punching step) after manufacturing. Further, the film may or may not be a multi-layer film, as long as it can be adhered to the sound absorbing material.

Any conventional punching tool can be used in the punching step, and is generally one designed according to a desired aperture size and an aperture ratio (see FIG. 3) of the punctured nonwoven fabric. The mechanism by which the punching tool forms the apertures is not particularly limited and may include, but is not limited to, punching, ultrasound waves, laser punching, or the like. Further, the punching method is not particularly limited as long as after punching the apertures, the apertures are not stopped up (do not close) again.

The punctured nonwoven fabric manufactured as described above may then be stacked with the sound absorbing material to form the composite sound absorbing material.

Figure 1B:
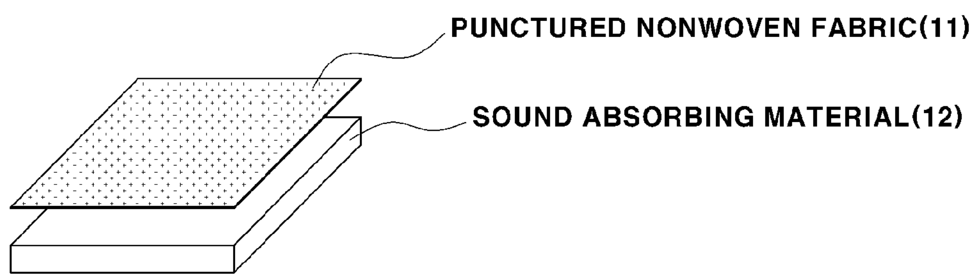
Figure 1C:
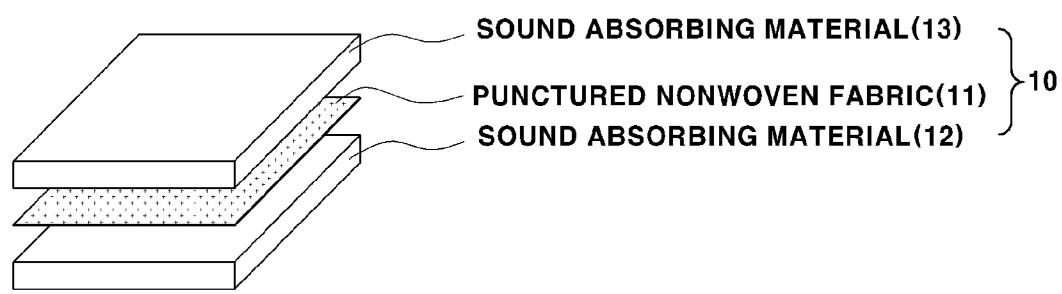

As shown in FIGS. 1A through 1C, according to an embodiment, the composite sound absorbing material may be formed of only the punctured nonwoven fabric, may be formed of the sound absorbing material stacked and adhered to a surface of the punctured nonwoven fabric, or may be formed of the sound absorbing material stacked and adhered to both surfaces of the punctured nonwoven fabric.

The composite sound absorbing material is basically positioned such that the punctured nonwoven fabric is directed toward a noise source. However, if a forming condition of a part (noise source) is very harsh or the part is likely to be contaminated due to exposure to the outside or the like, then the punctured nonwoven fabric can be positioned between the sound absorbing materials (see FIG. 1C) to prevent punctured parts (apertures of the punctured nonwoven fabric) from being stopped up (blocked) by foreign substances.

In this way, when the punctured nonwoven fabric is interposed between the sound absorbing materials, this may be done so as to maintain a ventilation structure. For example, the sound absorbing materials and the punctured nonwoven fabric may be bonded together using thermoplastic resin in a powder form, or the punctured nonwoven fabric can be manufactured using a film in the form of a web or a film having adhesive property together with the fabric and the punctured nonwoven fabric and the sound absorbing materials are adhered using the film.

That is, by using the film laminated with the fabric during manufacturing of the punctured nonwoven fabric, the sound absorbing materials which are later bonded are adhered to both surfaces of the punctured nonwoven fabric. When the film having adhesive property is used, the sound absorbing materials are adhered using the adhesive property of the film. When the film in a web form is used, a water-soluble adhesive can be used if the web has no adhesive property to adhere the sound absorbing materials. When the web has an adhesive property, the adhesive property of the web can be used to attach the sound absorbing materials.

When thermoplastic resin in a powder form is used, the thermoplastic resin can be scattered between the punctured nonwoven fabric and the sound absorbing materials. The punctured nonwoven fabric and the sound absorbing materials are then bonded together by applying a required heat of a predetermined temperature or higher and applying compression thereto.

Herein, the sound absorbing material generally refers to any porous material that can be used for sound absorption.

The composite sound absorbing material according to the present invention uses, as a sound absorbing material favorable to a low-frequency region, the punctured nonwoven fabric. By using the punctured nonwoven fabric, sound absorbing performance of a frequency region of 2 kHz or lower is improved, which was difficult to improve with a conventional sound absorbing/transmitting material. As such, the present material is capable of achieving effects equivalent or similar the use of sound absorbing materials manufactured using a plate-type material which is favorable to vibration absorption (causing energy loss due to membrane vibration) and a resonator favorable to resonance absorption (causing energy loss of sound waves due to frictional loss of the air in the neck of the resonator having a cavity therein). In particular, according to the present invention, by using both the punctured nonwoven fabric and the sound absorbing materials, resonance absorbing effect can be improved. Further, the present materials allows the peak point of the sound absorption coefficient of the low-frequency region of the composite sound absorbing material to be moved according to adjustment of a punching factor. This punching factor may be, for example, an aperture size or an aperture ratio of the punctured nonwoven fabric.

Therefore, in the above-described punching step, one or more of the aperture size and the aperture ratio for the multiple apertures of the punctured nonwoven fabric may be changed and adjusted to adjust the sound absorption coefficient as desired.

The composite sound absorbing material manufactured as described above has the following advantages when compared to conventional sound absorbing/transmitting materials.

1. Sound absorbing performance of a low-to-mid frequency region of 2 kHz or less, which is difficult to improve with conventional sound absorbing/transmitting materials, is improved.

2. In a space of a vehicle having thickness and weight constraints, the present composite sound absorbing material can be designed to replace conventional sound absorbing/transmitting materials, and can be used in the same space. Moreover, a sound transmitting material of a rubber type, which is a main weight increase factor, can be removed, thus providing a superior weight reduction effect.

3. Sound absorbing/transmitting performance for each part of the vehicle can be optimized by moving the peak point of the sound absorption coefficient based on punching specifications (or punching factor adjustment).

4. The multi-layer structure of the present composite sound absorbing material is relatively easy to achieve, such that the present composite sound absorbing material can be used in place of conventional sound absorbing/transmitting materials or may be extended to a sound absorbing/transmitting material-applied part.

Results of comparisons between the sound absorption performance of the composite sound absorbing material according to the present invention and the sound absorption performance of conventional sound absorbing/transmitting materials are shown in FIGS. 4A through 4D.

Figure 4A:
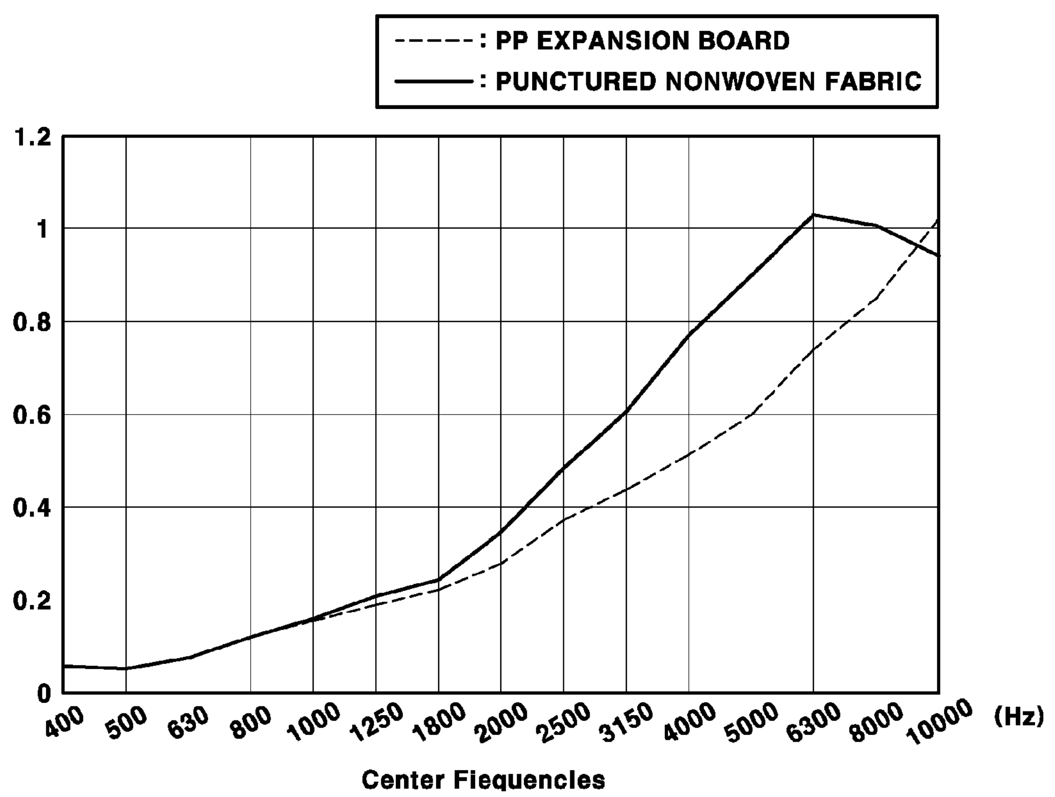
FIG. 4A is a graph comparing a sound absorbing coefficient of punctured nonwoven fabric according to an embodiment of the present invention with a sound absorbing coefficient of a conventional sound absorbing material.
Figure 4B:
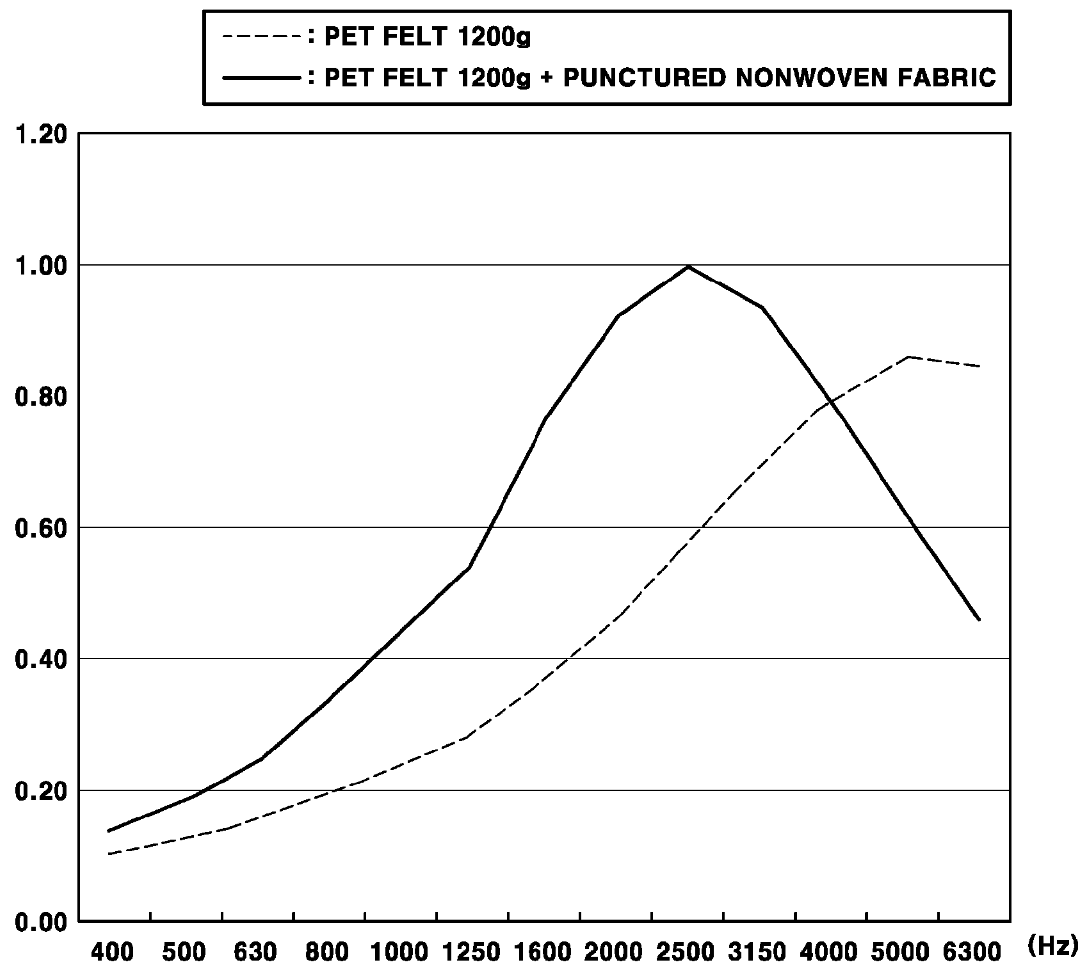
FIGS. 4B through 4D are graphs comparing a sound absorbing coefficient of a composite sound absorbing material according to an embodiment of the present invention with a sound absorbing coefficient of a conventional sound absorbing material.

FIG. 4A shows sound absorption coefficients of a punctured nonwoven fabric according to the present invention and a polypropylene (PP) expansion board as a conventional sound absorbing material. FIG. 4B shows sound absorption coefficients of a composite sound absorbing material according to the present invention and PET felt as a conventional sound absorbing material. The composite sound absorbing material was manufactured by attaching PET felt of 1200 g to the punctured nonwoven fabric, and the conventional PET felt was the same as the PET felt of 1200 g which formed part of the composite sound absorbing material according to the present invention.

Figure 4C:
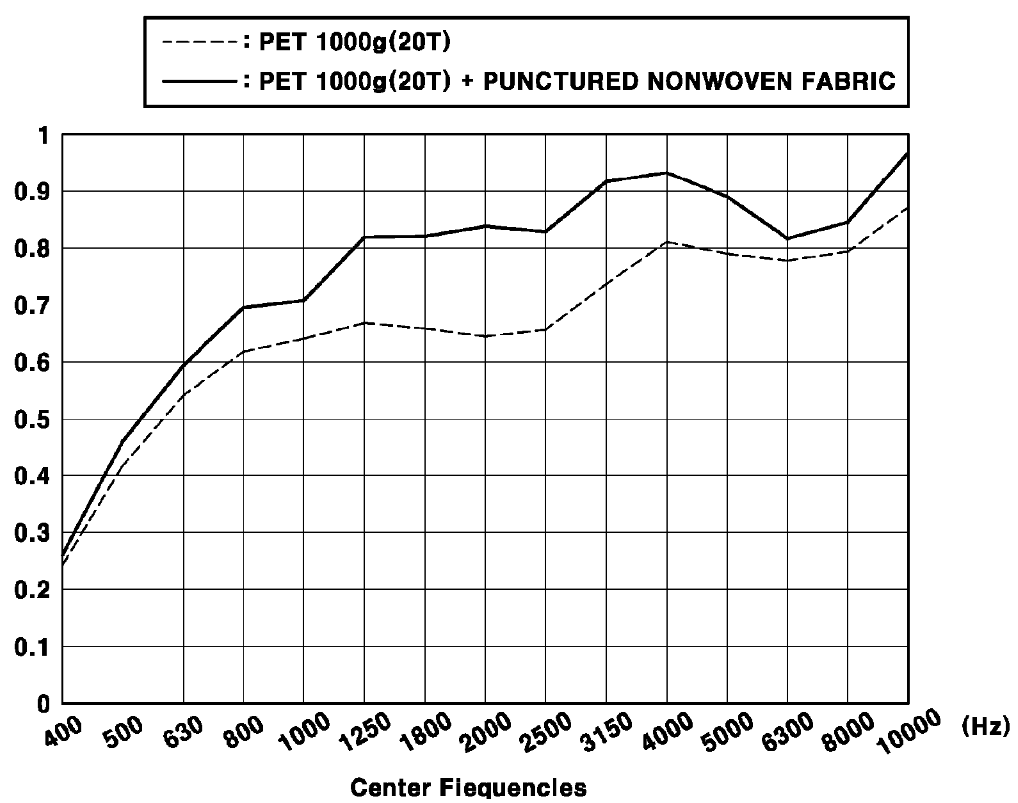

FIG. 4C shows sound absorption coefficients of a composite sound absorbing material according to the present invention and PET felt as a conventional sound absorbing material, like in FIG. 4B. In FIG. 4C, the composite sound absorbing material was manufactured by attaching PET felt, which was manufactured to have a thickness of 20 mm using PET of 1000 g, to punctured nonwoven fabric. The conventional PET felt was the same as the PET felt having a weight of 1000 g and a thickness of 20 mm which formed the composite sound absorbing material according to the present invention.

Figure 4D:
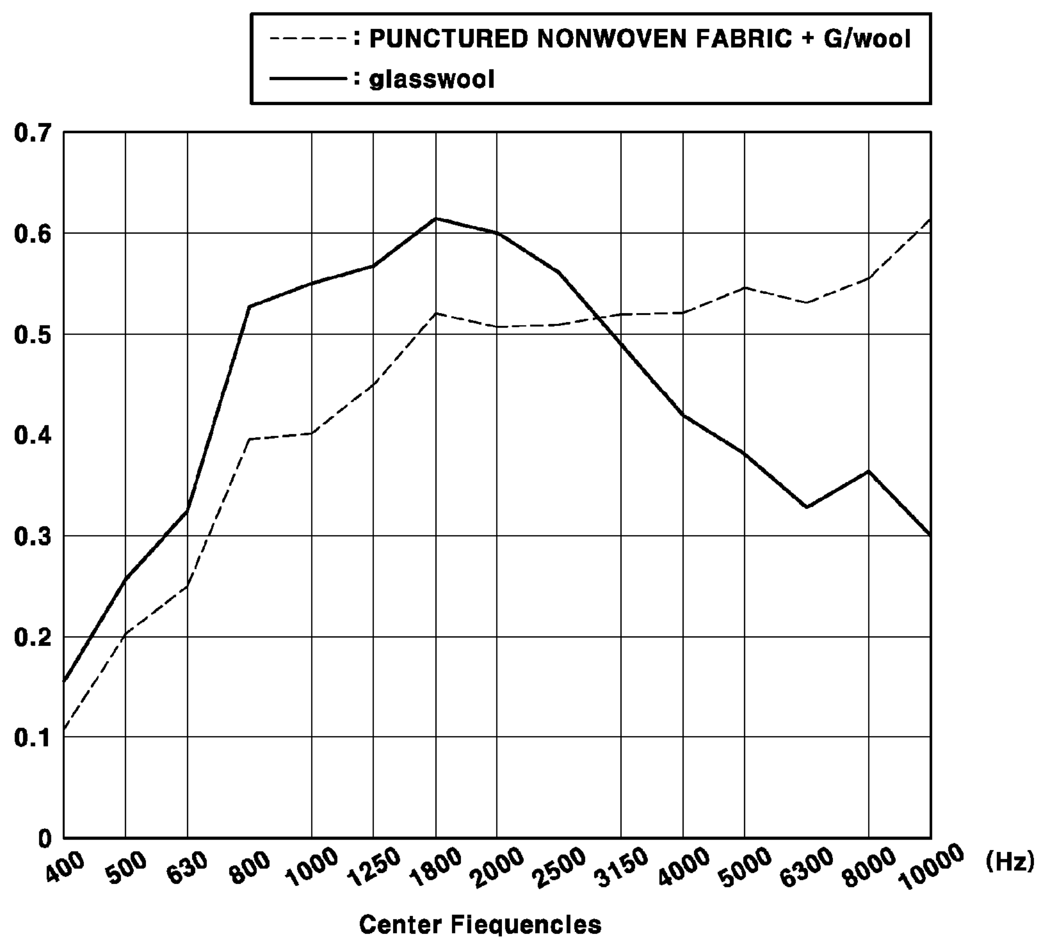
Figure 5A:
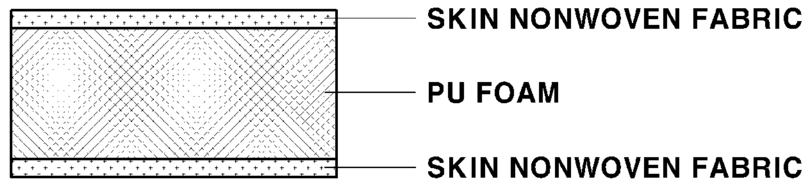
FIGS. 5A through 5C are diagrams showing a stacked structure of a conventional composite sound absorbing/transmitting material.
Figure 5B:
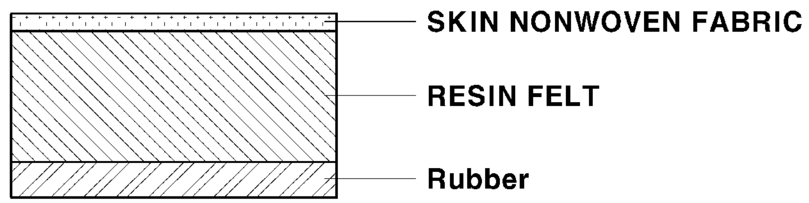
Figure 5C:
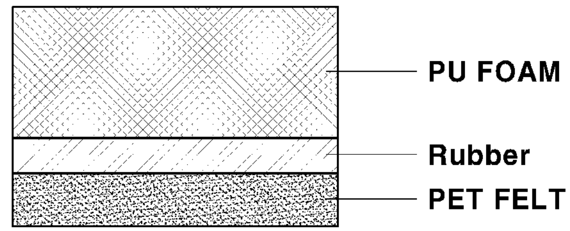

FIG. 4D shows sound absorption coefficients of a composite sound absorbing material according to the present invention and glass wool as a conventional sound absorbing material. The composite sound absorbing material was manufactured by bonding the glass wool to the punctured nonwoven fabric. The conventional glass wool was the same as the glass wool that formed the composite sound absorbing material according to the present invention.

As demonstrated by FIGS. 4B through 4D, the sound absorption coefficient of the composite sound absorbing material according to the present invention was improved in a low-to-mid frequency band, and as demonstrated by FIG. 4A, the sound absorption coefficient of the punctured nonwoven fabric according to the present invention was also improved in a low-to-mid frequency band.

The composite sound absorbing material for a vehicle manufactured according to the present invention improves the sound absorption coefficient of the low-to-mid frequency region. Further, by changing and adjusting a puncturing factor in a limited space of a vehicle having thickness and weight constraints, proper sound absorption performance with respect to a noise source can be provided. Moreover, the present invention allows for the removal of a sound transmitting material, which is a primary weight increase factor, thus providing the superior weight reduction effect.

While the present invention has been described, the scope of the present invention is not limited to the foregoing description.

DESCRIPTION OF REFERENCE NUMERALS

1: Bonding Tool
2: Punching Tool

What is claimed is:

1. A method of manufacturing a composite sound absorbing material for a vehicle, the method comprising:

a first step of using a bonding tool to laminate a fabric with a film, the fabric being provided in a sheet form;

a second step of puncturing the fabric laminated with the film to thereby manufacture a punctured nonwoven fabric; and a third step of attaching a sound absorbing material to both surfaces of the punctured nonwoven fabric, to prevent the punctured nonwoven fabric from being stopped up by foreign substances, wherein the attaching of the sound absorbing material comprises attaching the sound absorbing material to the punctured nonwoven fabric by using as the film of the punctured nonwoven fabric, a film having an adhesive property, attaching the sound absorbing material to the punctured nonwoven fabric by using the film.

2. The method of claim 1, wherein the second step further comprises adjusting a sound absorption coefficient by changing and adjusting one or more of an aperture size and an aperture ratio of the punctured nonwoven fabric.

3. The method of claim 1, wherein the punctured nonwoven fabric is manufactured in a form in which an aperture having a diameter of about 0.01-3.0 mm is punched, and an aperture ratio of the punctured nonwoven fabric is about 0.1-3.0.

4. The method of claim 1, wherein the bonding tool in a heat roller for lamination, and the heat roller for lamination, when operating, is maintained at a temperature range in which lamination can be achieved within about 50-200° C., and in order to guarantee sufficient hardening prior to arrival at a punching tool after lamination, a predetermined distance is provided between the heat roller and the punching tool.

5. A method of manufacturing a composite sound absorbing material for a vehicle, the method comprising:

a first step of using a bonding tool to laminate a fabric with a film, the fabric being provided in a sheet form;

a second step of puncturing the fabric laminated with the film to thereby manufacture a punctured nonwoven fabric, and a third step of attaching a sound absorbing material to both surfaces of the punctured nonwoven fabric, wherein the attaching of the sound absorbing material comprises attaching the sound absorbing material to the punctured nonwoven fabric by (a) using thermoplastic resin in a powder form, or (b) using as the film of the punctured nonwoven fabric, a film in a web form, and attaching the sound absorbing material to the punctured nonwoven fabric by using the film in the web form.

6. The method of claim 5, wherein the bonding tool in a heat roller for lamination, and the heat roller for lamination, when operating, is maintained at a temperature range in which lamination can be achieved within about 50-200° C., and in order to guarantee sufficient hardening prior to arrival at a punching tool after lamination, a predetermined distance is provided between the heat roller and the punching tool.

* * * * *